US010201028B2

United States Patent
Cheng et al.

(10) Patent No.: US 10,201,028 B2
(45) Date of Patent: Feb. 5, 2019

(54) NEAR-FIELD COMMUNICATION METHOD AND TERMINAL

(71) Applicant: Shenzhen Goodix Technology Co., Ltd., Guangdong (CN)

(72) Inventors: Siqiu Cheng, Guangdong (CN); Gengchun Deng, Guangdong (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 0 days.

(21) Appl. No.: 15/272,059

(22) Filed: Sep. 21, 2016

(65) Prior Publication Data
US 2017/0013660 A1  Jan. 12, 2017

Related U.S. Application Data

(63) Continuation of application No. PCT/CN2014/084148, filed on Aug. 12, 2014.

(30) Foreign Application Priority Data

Mar. 21, 2014  (CN) .......................... 2014 1 0108947

(51) Int. Cl.
*H04B 5/00* (2006.01)
*H04W 76/14* (2018.01)
(Continued)

(52) U.S. Cl.
CPC ............ *H04W 76/14* (2018.02); *G06F 3/044* (2013.01); *G09G 5/006* (2013.01); *H04B 5/0012* (2013.01);
(Continued)

(58) Field of Classification Search
CPC ... H04B 5/0012; H04B 5/0031; H04W 4/008; G06F 3/044
See application file for complete search history.

(56) References Cited

U.S. PATENT DOCUMENTS 9,030,422 B2 * 5/2015 Kim .................... H04M 1/7253
                                                178/18.01
2010/0081375 A1  4/2010 Rosenblatt et al.
(Continued)

FOREIGN PATENT DOCUMENTS

CN          202217780 U    5/2012
CN          102508518 A    6/2012
(Continued)

OTHER PUBLICATIONS

International Search Report and Written Opinion for PCT Application No. PCT/CN2014/084148 dated Nov. 4, 2014 (English translation of ISR attached).

(Continued)

*Primary Examiner* — Tuan Pham
(74) *Attorney, Agent, or Firm* — Tarolli, Sundheim, Covell & Tummino LLP (57) ABSTRACT

The present disclosure provides a near-field communication system and a terminal. The system includes: a first terminal having a first near-field communication region; and a second terminal having a second near-field communication region, where the second near-field communication region has a first subunit and a second subunit, and the first subunit and the second subunit are configured to detect a distance between the first near-field communication region and the second near-field communication region, and the second subunit is configured to establish communication with the first near-field communication region when the distance between the first near-field communication region and the second near-field communication region is less than or equal to a preset distance. Embodiments of the present disclosure may reduce signal attenuation and external interference in data transmission.

14 Claims, 8 Drawing Sheets

(51) Int. Cl.
*G06F 3/044* (2006.01)
*G09G 5/00* (2006.01)

(52) U.S. Cl.
CPC ....... *H04B 5/0031* (2013.01); *G09G 2370/16* (2013.01)

(56) References Cited

U.S. PATENT DOCUMENTS

| | | | |
|---|---|---|---|
| 2012/0214413 A1 | 8/2012 | Rose et al. | |
| 2013/0127774 A1* | 5/2013 | Hong | G06F 3/0416 345/174 |
| 2014/0051354 A1* | 2/2014 | Lee | H04B 5/00 455/41.1 |
| 2014/0240198 A1* | 8/2014 | Chen | H04N 5/4403 345/1.1 |
| 2015/0138142 A1* | 5/2015 | Liao | G06F 3/0488 345/174 |

FOREIGN PATENT DOCUMENTS

| | | |
|---|---|---|
| CN | 102545973 A | 7/2012 |
| CN | 102737582 A | 10/2012 |
| CN | 102804486 A | 11/2012 |
| CN | 102882545 A | 1/2013 |
| CN | 102916729 A | 2/2013 |
| CN | 103259569 A | 8/2013 |
| CN | 103279303 A | 9/2013 |
| CN | 103440075 A | 12/2013 |
| CN | 103944614 A | 7/2014 |

OTHER PUBLICATIONS

Office Action for corresponding CN Patent Appl. No. 201410108947.4, dated Jun. 25, 2015, pp. 1-8.

* cited by examiner

Fig. 9

NEAR-FIELD COMMUNICATION METHOD AND TERMINAL

CROSS-REFERENCE TO RELATED APPLICATIONS

The present application is a continuation of international application No. PCT/CN2014/084148, filed on Aug. 12, 2014, which claims priority to Chinese Patent Application No. 201410108947.4, filed on Mar. 21, 2014, both of which are hereby incorporated by reference in their entireties.

TECHNICAL FIELD

The present disclosure relates to the field of communication technologies, and in particular, to a near-field communication method and a terminal.

BACKGROUND

Near-field communication is a short-distance high-frequency wireless communication manner, and non-contact point-to-point data transmission may be performed between terminals within a range of approximately ten centimeters by means of near-field communication. In a conventional capacitive touch screen terminal having a near-field communication function, a near-field communication module and a touch detection module are distributed in different integrated chips. The near-field communication module implements data transmission to another terminal by using a dedicated antenna. However, the touch detection module detects whether a trigger operation exists on a touch screen of the terminal and a location of the trigger operation by using a driving electrode and a sensing electrode on a touch sensor. Because two integrated chips are used, a hardware circuit has a complex structure and a larger volume.

Currently, a near-field communication function may be implemented on a touch control chip by means of detecting an electric field. Specifically, after converting to-be-sent data into binary data by a first terminal having a first capacitive touch screen, a voltage is applied to an electrode participating in data transmission on the first capacitive touch screen, so as to form a corresponding electric field distribution. When a second terminal having a second capacitive touch screen gets in contact with the first terminal, the second terminal detects the electric field distribution, thereby parsing the corresponding data sent by the first terminal.

A currently existing problem may be that, due to use of the electric field detection manner, if the first capacitive touch screen and the second capacitive touch screen are relatively greatly different in terms of size, quality of communication may be reduced, leading to a failure of data transmission. In addition, because a terminal having a capacitive touch screen of a relatively large size does not match a terminal having a capacitive touch screen of a relatively small size, a communication signal is significantly attenuated and is vulnerable to external interference, and meanwhile detection also becomes more complex.

SUMMARY

The present disclosure aims to solve at least one of the foregoing technical problems.

Hence, a first objective of the present disclosure is to provide a near-field communication terminal. The terminal includes a second near-field communication region, wherein the second near-field communication region comprises a first subunit and a second subunit; wherein the second subunit is configured to detect, independently or cooperatively with the first subunit, a distance between a first near-field communication region of another terminal and the second near-field communication region, and to establish communication with the first near-field communication region when the distance is within a preset distance.

A second objective of the present disclosure is to provide a near-field communication method. The method includes detecting a distance between a first near-field communication region of a first terminal and a second near-field communication region of a second terminal by the second terminal, wherein the second near-field communication region comprises a first subunit and a second subunit; establishing communication between the first near-field communication region and the second near-field communication region when the distance is within a preset distance; and wherein the second subunit is configured to detect the distance, independently or cooperatively with the first subunit.

Some of additional aspects and advantages of the present disclosure are provided in the following description, and some of the additional aspects and advantages of the present disclosure become obvious in the following description or are learned by means of practice of the present disclosure.

BRIEF DESCRIPTION OF THE DRAWINGS

The foregoing and/or additional aspects and advantages of the present disclosure become obvious and easy to understand in the following description of embodiments with reference to the accompanying drawings, where:

FIG. 3-1 is a schematic diagram of channel switching at a fixed segmented location of a second terminal according to an embodiment of the present disclosure;

FIG. 3-2 is a flowchart of a detection method of automatically detecting a segmented location and performing channel switching on a second terminal according to an embodiment of the present disclosure;

FIGS. 3-3 and FIGS. 3-4 are schematic diagrams of automatically detecting a segmented location and performing channel switching on a display screen (some channels are omitted) of a second terminal according to an embodiment of the present disclosure;

FIG. 5-1 is a schematic diagram of dividing a display screen of a second terminal into two blocks according to an embodiment of the present disclosure;

FIG. 5-2 is a schematic diagram of dividing a display screen (some channels are omitted) of a second terminal into two blocks according to an embodiment of the present disclosure;

DETAILED DESCRIPTION

The following describes embodiments of the present disclosure in detail and examples of the embodiments are shown in the accompanying drawings, where the same or similar reference numerals always represent the same or similar elements or elements having the same or similar functions. The following embodiments described with reference to the accompanying drawings are illustrative, only for the purpose to explain the present disclosure, and cannot be understood as limitations to the present disclosure. On the contrary, the embodiments of the present disclosure include all of changes, amendments, and equivalents that fall within a scope of spirit and connotations of the appended claims.

In the description of the present disclosure, it should be understood that the terms "first," "second," and the like are only used for the purpose of description, and cannot be understood as an indication or implication of relative importance. In the description of the present disclosure, it should be noted that unless otherwise clearly stipulated and defined, the terms "connected" and "connection" should be understood in a broad sense. For example, the connection may be a fixed connection, a detachable connection, or an integral connection; the connection may be a mechanical connection, or an electrical connection; and the connection may be a direct connection or an indirect connection via a medium. For persons of ordinary skill in the art, specific meanings of the foregoing terms in the present disclosure can be understood in specific cases. In addition, in the description of the present disclosure, unless otherwise described, the meaning of "multiple" is two or more.

Description of any process or method described in other manners or herein can be understood as: indicating one or more modules, segments, or parts configured to implement a specific logic function or a code of an executable instruction for steps of a process. In addition, a range of preferable implementation manners of the present disclosure include other implementations, where functions can be implemented without conforming to a shown or discussed sequence, including conforming to a basically synchronous manner or an inverse sequence according to involved functions, which should be understood by persons of ordinary skill in the technical field to which the embodiments of the present disclosure belong.

The following describes, with reference to the accompanying drawings, a system and a terminal for cross-terminal communication according to embodiments of the present disclosure.

Figure 1:
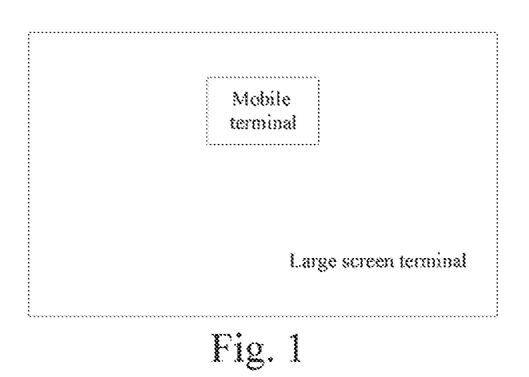
FIG. 1 is a schematic diagram of an interaction manner of near-field communication between a large screen terminal and a small screen mobile terminal in related art.

Currently, during near-field communication between terminals, in most cases, a size of a first capacitive touch screen of a second terminal and a size of a second capacitive touch screen of a first terminal are significantly different. Therefore, quality of communication may be reduced, leading to a failure of data transmission. For example, as shown in FIG. 1, when a notebook computer performs near-field communication with a mobile phone, the screen of the notebook computer is in a power on state and waits for approaching of the mobile phone, and data transmission can be implemented when the mobile phone is in proximity to any location of the screen of the notebook computer. Although the foregoing manner has a lower requirement on user operation, a major problem may exist in application. Because an area for receiving effective data transmission signals in the notebook computer is smaller (the area for receiving effective data signals is no more than the area of the mobile phone), other receiving regions of the notebook computer cannot effectively receive data transmission signals and will receive noise. In addition, a non-effective part (for example, a part of a region that does not correspond to a mobile phone transmitting region) of the receiving regions in the notebook computer may further be coupled to a system ground GND of the mobile phone, which would cause effective signals to be canceled. When the mobile phone is in proximity to the notebook computer and transmits data transmission signals, the signals received by the notebook computer are relatively weak, and communication quality is relatively low, and it is difficult to implement stable transmission. Therefore, if the data transmission signals can be enhanced by reducing a receiving area of the notebook computer, that is, the mobile phone performs communication with the notebook computer in a specified communication region in the notebook computer, signal attenuation and external interference can be reduced, and communication quality can be improved. Hence, the present disclosure provides a system for cross-terminal communication.

Figure 2:
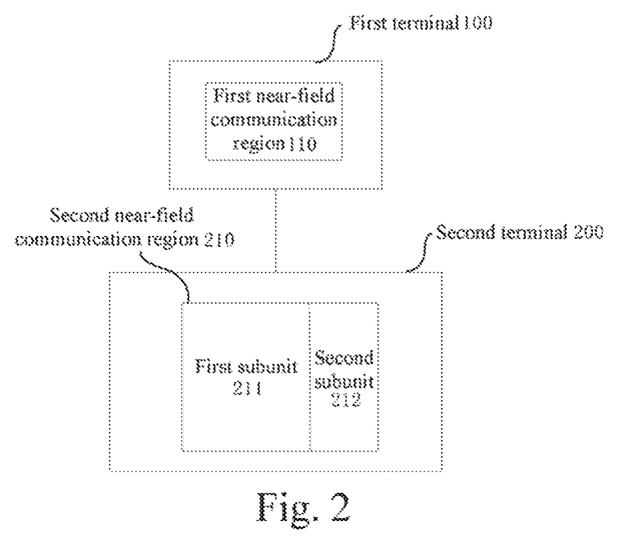
FIG. 2 is a schematic structural diagram of a near-field communication system according to an embodiment of the present disclosure.

FIG. 2 is a schematic structural diagram of a near-field communication system according to an embodiment of the present disclosure. As shown in FIG. 2, the near-field communication system includes a first terminal 100 and a second terminal 200, where the first terminal 100 includes a first near-field communication region 110, and the second terminal 200 includes: a second near-field communication region 210 which may include a first subunit 211 and a second subunit 212.

Specifically, the first terminal 100 has the first near-field communication region 110, where the first terminal 100 may be a mobile phone or the like. The second terminal 200 has the second near-field communication region 210, where the second terminal 200 may be a notebook computer, a palmtop computer, a television, a display, or the like. The second near-field communication region 210 includes the first subunit 211 and the second subunit 212. The first subunit 211 and the second subunit 212 or merely the second subunit 212 are (is) used to detect whether a distance between the first near-field communication region 110 and the second near-field communication region 210 is less than or equal to a preset distance. The second subunit 212 is used to establish communication with the first near-field communication region 110 when the distance between the first near-field communication region 110 and the second near-field communication region 210 is less than or equal to a preset distance, where the first near-field communication region 110 may perform communication with the second subunit 212 of the second near-field communication region 210 by means of near-field communication. The foregoing detecting whether a distance between the first near-field communication region 110 and the second near-field communication region 210 is less than or equal to a preset distance can be implemented by prior art, which, to avoid redundancy, is not further described in detail herein.

For example, the first terminal 100 has a near-field communication region of a smaller area, and the second terminal 200 has a near-field communication region of a larger area. For example, the first terminal 100 is a mobile phone, and the second terminal 200 is a tablet computer; or the first terminal 100 is a palmtop computer, and the second terminal 200 is a notebook computer, or the like. The first terminal 100 and the second terminal 200 have the first near-field communication region 110 and the second near-field communication region 210, respectively. For example, the first near-field communication region 110 is a display screen of a mobile phone, and the second near-field communication region 210 is a display screen of a notebook computer, or the first near-field communication region 110 is a display screen of a mobile phone, and the second near-field communication region 210 is a touchpad, or the like.

A communication process between the first terminal 100 and the second terminal 200 may be divided into proximity detection and data communication. The proximity detection is a preparation phase of the data communication. Generally, touch detection and the proximity detection are performed in a time-sharing manner, and a data communication phase begins only after the proximity detection succeeds. The touch detection and the proximity detection may be referred to as a first detection phase, and data near-field communication may be referred to as a second detection phase. In the first detection phase, a touch device can support a touch function and a proximity detection function synchronously. The following mainly discusses the touch detection in the first detection phase, and a processing manner of the proximity detection is similar to that of the touch detection.

An objective of the proximity detection is to enable the second terminal 200 to sense whether the first terminal 100 in communication with the second terminal 200 exists. Because in this proximity detection process, the second terminal 200 does not need to perform data transmission with the first terminal 100, a requirement on communication quality is lower.

Specifically, touch detection and proximity detection on different regions in the second near-field communication region 210 of the second terminal 200 can be implemented by using a detection channel switching manner.

Figure 3:
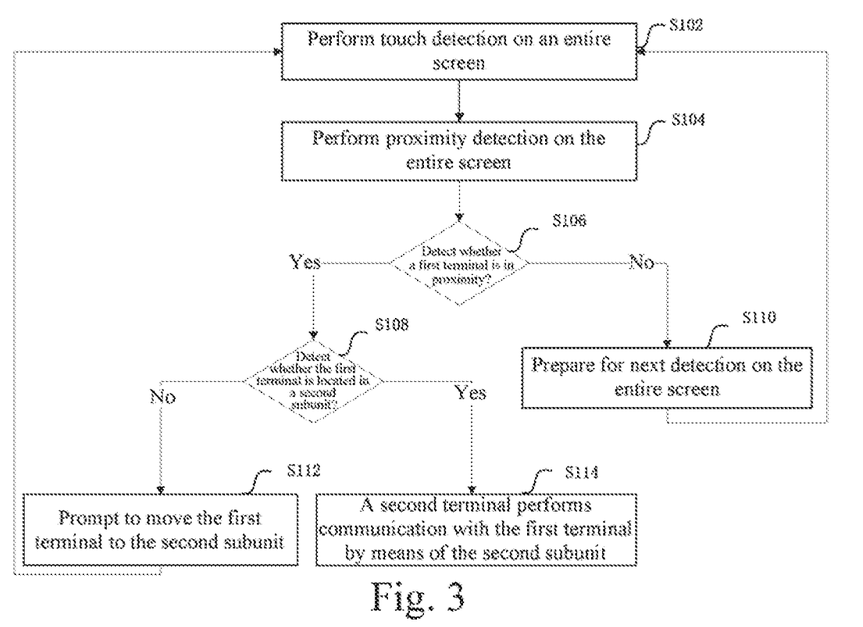
FIG. 3 is a flowchart of a detection method for performing channel switching at a fixed segmented location of a second terminal according to an embodiment of the present disclosure.

FIG. 3 is a processing flowchart of performing fixed channel switching by a near-field communication system according to an embodiment of the present disclosure, and a specific process includes:

S102, first, performing a touch detection on an entire screen constituted by a first subunit 211 and a second subunit 212, so as to complete the touch detection of the first detection phase;

S104, performing a proximity detection on the entire screen constituted by the first subunit 211 and the second subunit 212, so as to complete the proximity detection of the first detection phase;

S106, in a proximity detection phase, determining, according to a detection result, whether a distance between a first terminal 100 and a second terminal 200 less than or equal to a preset distance, if yes, proceeding to S108, and otherwise, proceeding to S110;

S108, determining, according to a proximity detection result of the second subunit 212, whether the first terminal 100 is located therein, if yes, proceeding to S114, and otherwise, proceeding to S112;

S112, prompting a user to move the first terminal 100 to the second subunit 212 of the second terminal 200, and proceeding to S102; and S114, if the first terminal 100 in the preset distance exists, performing data transmission by means of the second subunit to complete communication;

S110, if the first terminal 100 in the preset distance does not exist, proceeding to S102 to perform the touch detection and the proximity detection again.

Figure 31:
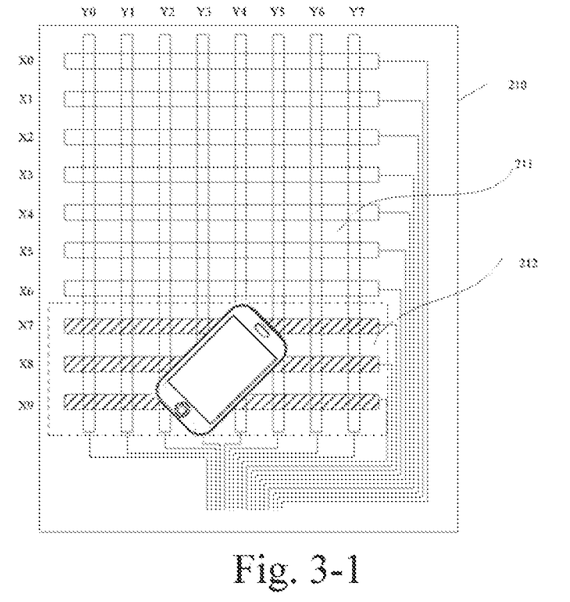

As shown in FIG. 3-1, a second near-field communication region 210 of the second terminal 200 may include the first subunit 211 and the second subunit 212. Specifically, the second near-field communication region 210 may be divided into two regions of different sizes, namely, the first subunit 211 (a region outside a dashed line box) and the second subunit 212 (a region inside the dashed line box), by means of software segmentation. When it is detected that a first near-field communication region 110 of the first terminal 100 is in proximity to the second near-field communication region 210 of the second terminal 200, communication with the first near-field communication region 110 of the first terminal 100 is established by the second subunit 212. When the second subunit 212 performs communication with the first near-field communication region 110, the first subunit 211 (some or all channels therein) in the second near-field communication region 210 is controlled to stop working.

Specifically, stopping working mainly refers to that channels keep a state of having smaller interference on other channels, for example, a disconnected (suspended) state or a direct-current fixed-level state, and in particular, refers to keeping the direct-current fixed-level state.

As shown in FIGS. 3-1, Y0 to Y7 are longitudinal channels, and X0 to X9 are transversal channels, and these electrodes are used as touch and near-field communication electrode channels (in a typical mutual capacitive touch screen, Y0 to Y7 are driving channels, and X0 to X7 are sensing channels; and it should be understood that one detection channel may have both a driving function and a sensing function at the same time, and a detection channel mainly refers to an electrode channel having a sensing function). For the second near-field communication region 210 in which Y0 to Y7 are drive channels, and X0 to X9 are sensing channels, when touch scanning of the first detection phase is performed on the second near-field communication region 210, all electrode channels in the second near-field communication region 210 may be scanned. That is, not only all the drive channels and sensing channels in the first subunit 211, but also all the drive channels and sensing channels in the second subunit 212 are scanned.

In this case, the obtained data is used for touch processing on the second near-field communication region 210. It should be understood that if proximity detection needs to be performed on the entire screen, the proximity detection of the first detection phase may be completed according to a processing manner similar to that of the foregoing touch detection. If proximity detection only needs to be performed on the second subunit, scanning is merely performed on all drive channels and sensing channels (for example, channels X7 to X9 in the region inside the dashed line region in FIG. 3) of the specified second subunit 212, so as to complete the proximity detection processing.

When data near-field communication of the second detection phase is performed on the second near-field communication region 210, scanning is merely performed on all detection channels (for example, the channels X7 to X9 in a dashed line region in FIG. 3) of the specified second subunit 212, and in this case, the obtained data is used for communication processing on the second near-field communication region 210. Therefore, if near-field communication is performed with the first terminal 100 only by means of a specified region (that is, the second subunit 212), an area used for receiving effective signals of the second terminal 200 keeps unchanged, and an area used for overall receiving of the second terminal 200 is reduced. Hence, communication quality of signals is improved.

It should be understood that if X7 to X9 in the second terminal 200 have both a driving function and a sensing function at the same time, during data transmission, driving and receiving may also be performed by merely using the channels X7 to X9 of the second subunit 212. Hence, power of the second terminal 200 can be saved.

The second terminal 200 not only can support fixed segmented regions implemented via software, that is, setting in advance a plurality of detection channels of a specified region (for example, X7 to X9 in FIG. 3) in the second terminal as the second subunit, and setting the remaining detection channels as the first subunit, but also can dynamically set the detection channels on the second terminal overlapped with the first near-field communication region as the second subunit, and set the remaining detection channels as the first subunit.

Figure 32:
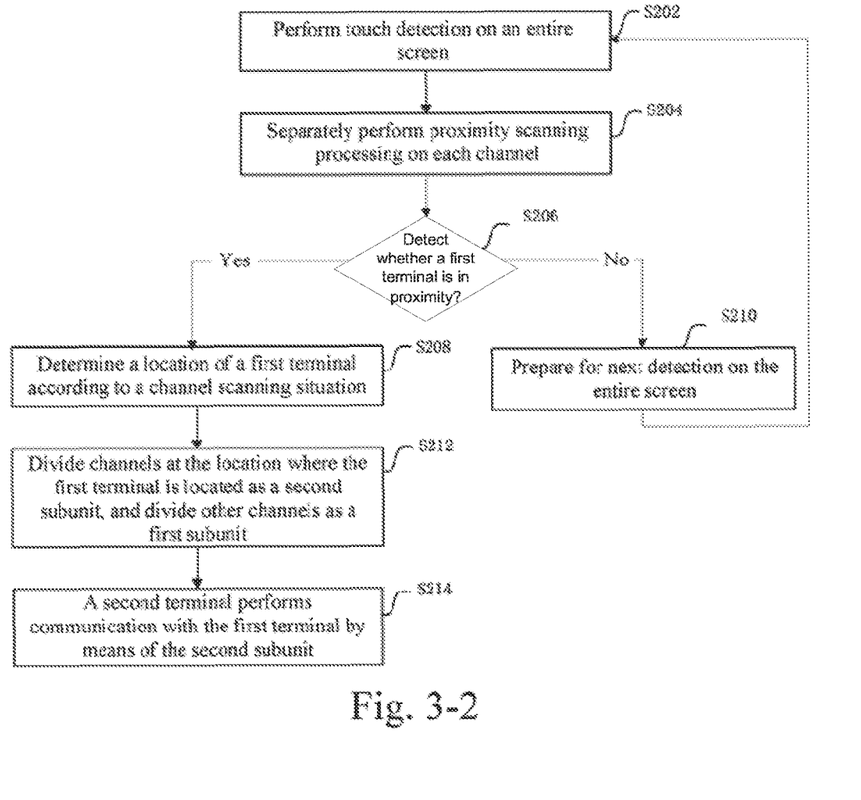

FIG. 3-2 is a flowchart of a processing method of automatically detecting a segmented location and performing channel switching on a display screen of a second terminal according to an embodiment of the present disclosure, where the method includes:

S202, first, performing touch detection on an entire screen constituted by a first subunit 211 and a second subunit 212 to complete the touch detection of the first detection phase;

S204, performing a proximity detection scanning separately on all channels in a second near-field communication region 210, so as to complete the proximity detection of the first detection phase;

S206, in the proximity detection phase, determining, by means of a detection result, whether a distance between a first terminal 100 and a second terminal 200 is less than or equal to a preset distance, if yes, proceeding to S208, and otherwise, proceeding to S210;

S208, determining, according to a scanning result of each channel, a proximity location of the first terminal 100;

S212, according to the proximity location of the first terminal, dividing detection channels in a region where the first terminal is overlapped with the second terminal as the second subunit 212 for performing subsequent near-field communication and other channels outside the region as the first subunit 211;

S214, according to the regions divided in S212, the second terminal 200 completing communication with the first terminal 100 by means of the second subunit 212.

Figure 33:
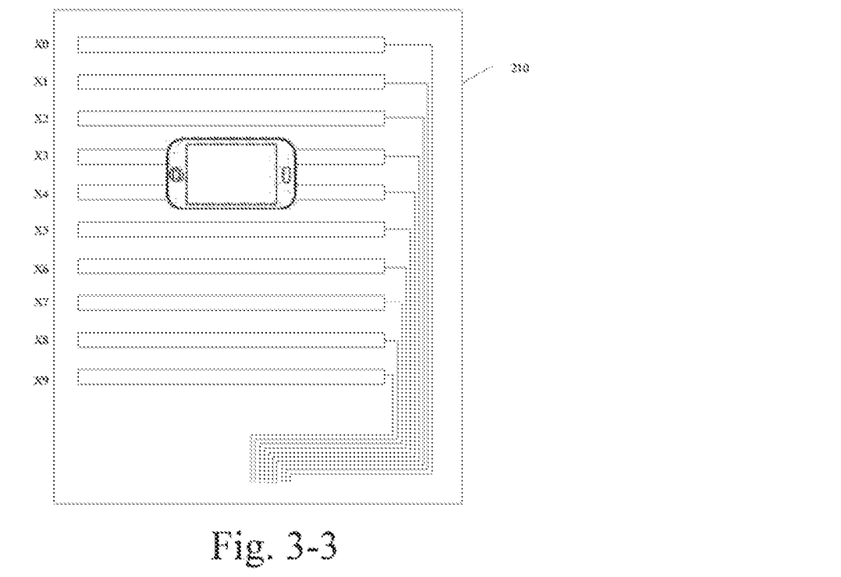
Figure 34:
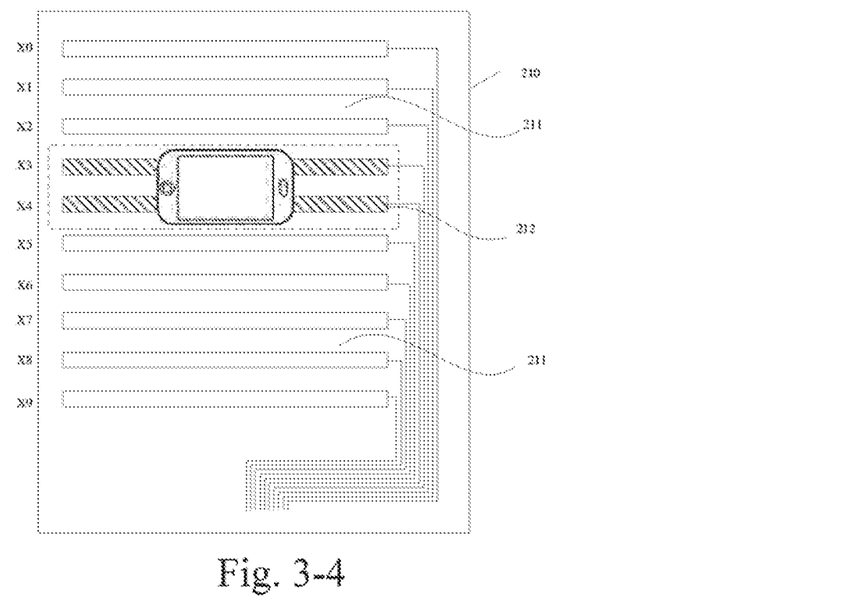

As shown in FIG. 3-3 (Y channels are omitted in the figure), when the proximity detection of the first detection phase is performed on the second near-field communication region 210, the location of the first terminal 100 may be identified according to a difference between different channels wherein: first, the proximity detection scanning is performed on all channels on the entire screen; and by means of a data difference between different channels, it can be found that the first terminal 100 is placed in proximity to X3 and X4. As shown in FIG. 3-4, after the location where second terminal 100 is placed is identified, the second terminal 200 automatically divides detection channels X3 and X4 of the second communication region 210 as the second subunit 212 for performing subsequent near-field communication. In this case, other channels constitute the first subunit 211. In a communication phase, merely some channels of the second communication region 210 specified in the figure are scanned and received, thereby improving communication quality.

The near-field communication system of the embodiment of the present disclosure, by means of software segmentation, uses a specified region in the near-field communication region of the second terminal as a dedicated communication region by using channel switching, and when detecting proximity of the first terminal, the second terminal performs near-field communication with the first terminal by means of the specified region, thereby reducing signal attenuation and external interference in data transmission and improving communication quality.

Although in the foregoing embodiments, a problem that signals are weaker during data transmission between the first terminal 100 and the second terminal 200 can be better solved by means of channel switching, in a case in which the second terminal 200 has a larger near-field communication region (for example, 20 inches or greater than 20 inches), because the spacing between driving channels or sensing channels in the second near-field communication region 210 of the second terminal 200 is excessively large, the problem that signals are weaker still exists in data transmission between the first terminal 100 and the second terminal 200. Therefore, in the following embodiments, the second near-field communication region 210 in the second terminal 200 may be further divided into two blocks by means of hardware segmentation, and a large second near-field communication region 210 is constituted by two electrode regions having independent driving channels and sensing channels. In this way, the problem that signals are weaker during data transmission between the first terminal 100 and the second terminal 200 can be resolved preferably.

Figure 4:
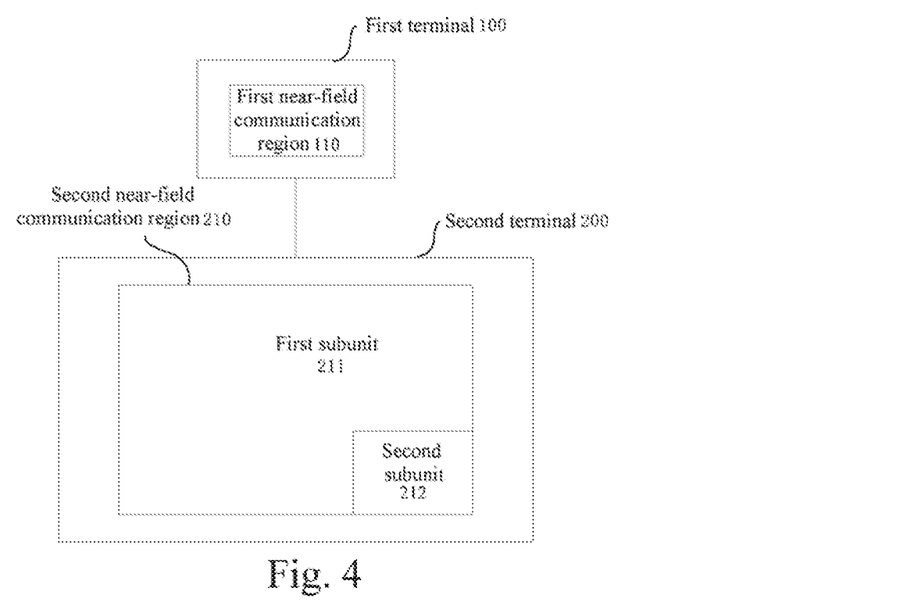
FIG. 4 is a schematic structural diagram of a near-field communication system according to another embodiment of the present disclosure.

FIG. 4 is a schematic structural diagram of a near-field communication system according to another embodiment of the present disclosure. As shown in FIG. 4, the near-field communication system includes a first terminal 100 and a second terminal 200, where the first terminal 100 includes a first near-field communication region 110, and the second terminal 200 includes: a second near-field communication region 210 including a first subunit 211 and a second subunit 212.

Specifically, the second near-field communication region 210 includes the first subunit 211 and the second subunit 212; the first subunit 211 and the second subunit 212 or merely the second subunit 212 are (is) configured to detect whether a distance between the first near-field communication region 110 and the second near-field communication region 210 is less than or equal to a preset distance; the second subunit 212 is configured to establish communication with the first near-field communication region 110 when it is detected that the distance between the first near-field communication region 110 and the second near-field communication region 210 is less than or equal to a preset distance.

Further, when the second terminal 200 does not detect that the distance between the first near-field communication region 110 and the second near-field communication region 210 is less than or equal to the preset distance, touch detection and proximity detection need to be performed on the second near-field communication region 210 of the second terminal in a time-sharing manner, and a data communication phase begins only after the proximity detection succeeds. Touch detection and proximity detection may be referred to as a first detection phase, and data near-field communication may be referred to as a second detection phase.

Figure 5:
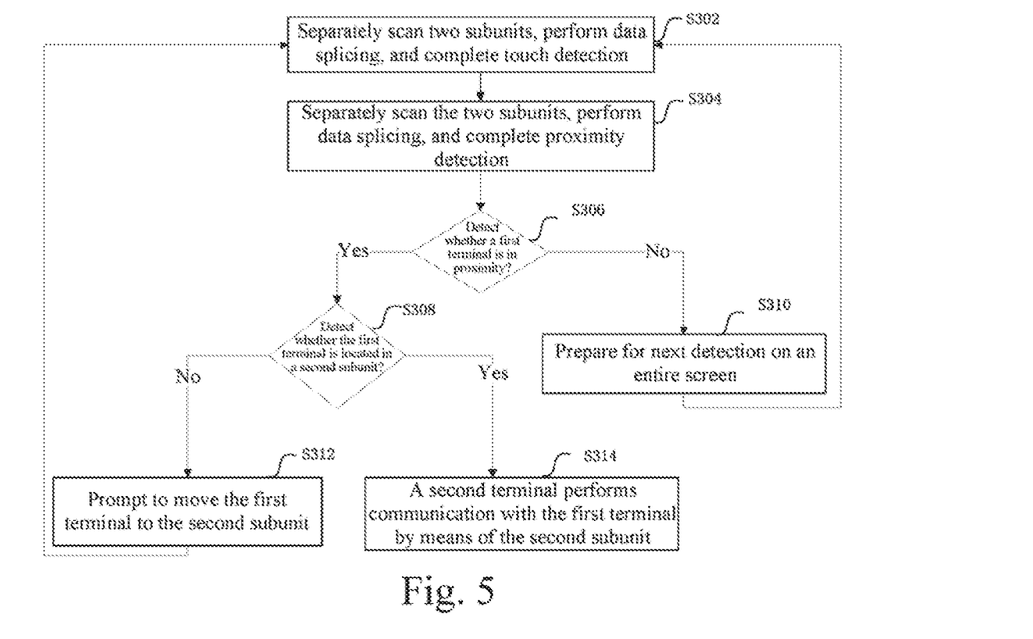
FIG. 5 is a flowchart of a detection method of dividing a display screen of a second terminal into two blocks according to an embodiment of the present disclosure.

FIG. 5 is a flowchart of a processing method of dividing a display screen of a second terminal into two blocks according to an embodiment of the present disclosure, and a specific process includes:

S302, separately scanning the first subunit 211 and the second subunit 212, performing processing such as splicing to data, and after obtaining data of an entire screen, completing touch detection;

S304, separately scanning the first subunit 211 and the second subunit 212, performing processing such as splicing to data, and after obtaining data of the entire screen, completing proximity detection;

S306, according to a proximity detection result, determining whether proximity of a first terminal 100 is detected, if yes, proceeding to S308, and otherwise, proceeding to S310;

S310, if proximity of the first terminal 100 does not exist, then proceeding to S302 to perform next touch detection, proximity detection, and the like again;

S308, determining, according to the proximity detection result of the second subunit 212, whether the first terminal 100 is located therein, if yes, proceeding to S314, and otherwise, proceeding to S312;

S312, after it is determined that a distance between the first terminal 100 and the second terminal 200 is less than or equal to a preset distance, prompting, by means of a certain means (for example, an identifier, etc.), a user to move the first terminal 100 to the second subunit 212, and then proceeding to S302; and S314, the second terminal 200 performing communication with the first terminal 100 by means of the second subunit 212.

Figure 51:
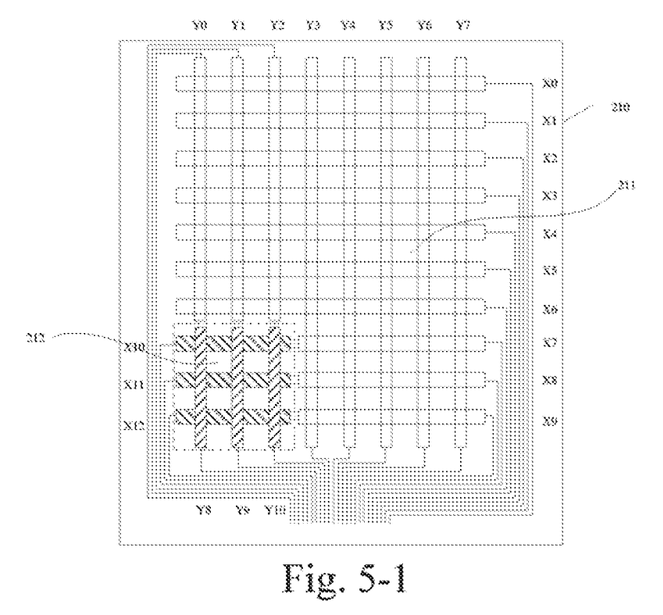

As shown in FIG. 5-1, in this embodiment of the present disclosure, the second near-field communication region 210 of the second terminal 200 may be divided into two blocks, namely, a first subunit 211 in a non-communication region and a second subunit 212 in a communication region. Different from FIG. 2, the second subunit 212 in FIG. 5-1 has independent electrode channels (typically, for example, Y8 to Y10 are drive channels, and X10 to X12 are sensing channels; and it should be understood that each channel may also have both a driving function and a sensing function at the same time). That is, electrode channels in the first subunit 211 do not cover the second subunit 212, and the second near-field communication region 210 of the second terminal 200 is equivalent to being constituted by two electrode regions combined with each other. In this way, an area of a region for performing communication between the second near-field communication region 210 and the first near-field communication region 110 can be further reduced, thereby improving communication quality.

As shown in FIG. 5-1, during the touch detection, driving channels and sensing channels in the first subunit 211 and the second subunit 212 are controlled synchronously to separately obtain data of the two electrode regions. Then, splicing processing is performed on the data of the two electrode regions to obtain data of the second near-field communication region 210 for performing touch processing on the second near-field communication region 210. During the data near-field communication, only the driving channels and the sensing channels in the second subunit 212 are controlled to obtain data of the second subunit 212 for performing communication processing on the second near-field communication region 210. Specifically, during touch scanning of the first detection phase, all channels in the first subunit 211 and the second subunit 212 are scanned synchronously, and the data of the two electrode regions are combined to generate data of the entire second near-field communication region 210. For example, two parts of data, as shown in Table 1 and Table 2, can be obtained during the first detection phase, wherein:

A0 to A10, B0 to B10, A'0 to A'2 . . . represent sampled data of each detection node, respectively. Typically, for example, A0 to A7 represent sampled data of nodes formed by X0 and Y0 to Y7, and A'0 to A'2 represent sampled data of nodes formed by X10 and Y8 to Y10, and so on.

| A0 | B0 | C0 | D0 | E0 | F0 | G0 | H0 | I0 | J0 |
|----|----|----|----|----|----|----|----|----|----|
| A1 | B1 | C1 | D1 | E1 | F1 | G1 | HI | I1 | J1 |
| A2 | B2 | C2 | D2 | E2 | F2 | G2 | H2 | I2 | J2 |
| A3 | B3 | C3 | D3 | E3 | F3 | G3 | H3 | I3 | J3 |
| A4 | B4 | C4 | D4 | E4 | F4 | G4 | H4 | I4 | J4 |
| A5 | B5 | C5 | D5 | E5 | F5 | G5 | 0  | 0  | 0  |
| A6 | B6 | C6 | D6 | E6 | F6 | G6 | 0  | 0  | 0  |
| A7 | B7 | C7 | D7 | E7 | F7 | G7 | 0  | 0  | 0  |

Table 1 shows sampled data of the first subunit 211

| A'0 | B'0 | C'0 |
|-----|-----|-----|
| A'1 | B'1 | C'1 |
| A'2 | B'2 | C'2 |

Table 2 shows sampled data of the second subunit 212

Then, the data shown in Table 1 and Table 2 are combined to calculate the data, as shown in table 3, of the entire second near-field communication region 210. In this way, a data collection process of the touch detection that is performed on the second near-field communication region 210 can be completed.

It should be understood that if the proximity detection needs to be performed on the entire screen, the data collection process of the proximity detection of the first detection phase may be completed according to a processing manner similar to that of the foregoing touch detection; and if the proximity detection only needs to be performed on the second subunit, merely the electrode channels of the specified second subunit 212 are scanned, so as to complete data collection processing of the proximity detection.

| A0 | B0 | C0 | D0 | E0 | F0 | G0 | H0 | I0 | J0 |
|----|----|----|----|----|----|----|----|----|----|
| A1 | B1 | C1 | D1 | E1 | F1 | G1 | HI | I1 | J1 |
| A2 | B2 | C2 | D2 | E2 | F2 | G2 | H2 | I2 | J2 |
| A3 | B3 | C3 | D3 | E3 | F3 | G3 | H3 | I3 | J3 |
| A4 | B4 | C4 | D4 | E4 | F4 | G4 | H4 | I4 | J4 |
| A5 | B5 | C5 | D5 | E5 | F5 | G5 | A'0 | B'0 | C'0 |
| A6 | B6 | C6 | D6 | E6 | F6 | G6 | A'1 | B'1 | C'1 |
| A7 | B7 | C7 | D7 | E7 | F7 | G7 | A'2 | B'2 | C'2 |

Table 3 shows combined data of the second near-field communication region 210

When communication scanning of the second detection phase is performed, merely electrode channels of a specified region are scanned, that is, in FIG. 5, merely a region constituted by Y8 to Y10 and X10 to X12 is scanned. In this case, the obtained data are used for communication processing on the second near-field communication region 210.

Figure 52:
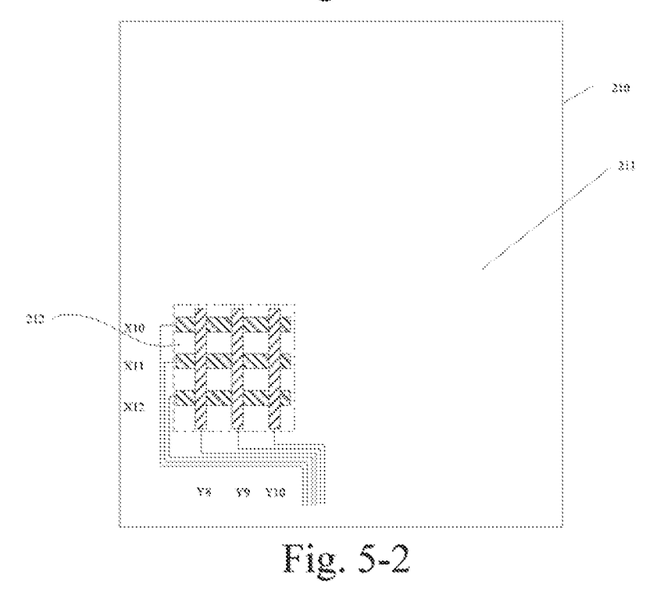

FIG. 5-2 is a schematic structural diagram of relevant wiring in the second subunit 212 emphasized in such a way the relevant channels of the first subunit 211 in FIG. 5 are omitted.

As shown in FIG. 3-1, when hardware segmentation is not performed, in the second near-field communication region 210, a peripheral wire is separately led out from one end of Y/X channels. As shown in FIGS. 5-1 and FIGS. 5-2, a segment is respectively cut out at an end of Y and an end of X by means of hardware segmentation, so as to constitute the second subunit 212. The second subunit 212 performs wiring from one end of a screen body, for example, Y8 to Y10 and X10 to X12 in the figures; the first subunit 211 performs wiring from the other end of the screen body, for example, Y0 to Y7 and X0 to X9 in the figure. In the phase of the first detection phase, during the touch detection, all channels (including the first subunit 211 and the second subunit 212) participate in the detection; during the proximity detection, all channels (including the first subunit 211 and the second subunit 212) or channels in the second subunit 212 participate in the detection. However, in the second phase, only Y and X channels in the second subunit 212 participate in the near-field communication, thereby achieving an effect of reducing an overall signal receiving area.

In the communication phase, merely channels of the second subunit 212 specified in the drawing are scanned and received, thereby improving communication quality.

The near-field communication system of the embodiment of the present disclosure, by means of hardware segmentation, uses the specified region in the near-field communication region of the second terminal as a dedicated communication region and makes it have independent electrode channels; and when detecting proximity of the first terminal, the second terminal performs data transmission with the first terminal by means of the specified region. In this way, signal attenuation and external interference in data transmission can be further reduced, thereby improving communication quality.

Figure 6:
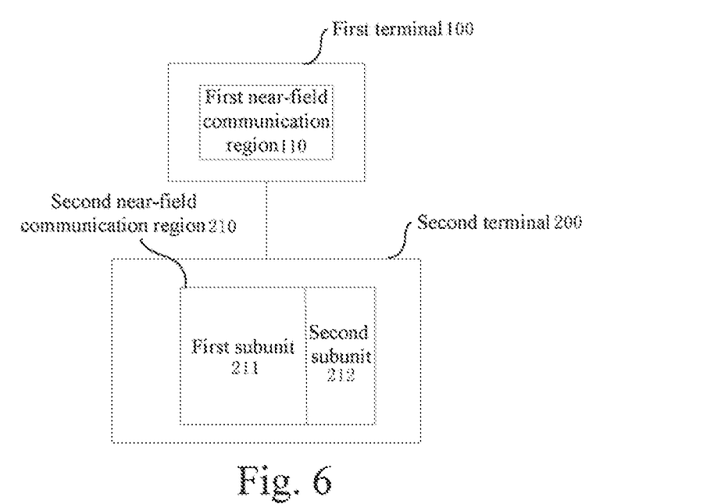
FIG. 6 is a schematic structural diagram of a near-field communication system according to still another embodiment of the present disclosure.

FIG. 6 is a schematic structural diagram of a near-field communication system according to another embodiment of the present disclosure. As shown in FIG. 6, the near-field communication system includes a first terminal 100 and a second terminal 200, where the first terminal 100 includes a first near-field communication region 110, and the second terminal 200 includes: a second near-field communication region 210 including a first subunit 211 and a second subunit 212.

Specifically, the first terminal 100 has the first near-field communication region 110, where the first terminal 100 may be a mobile phone.

The second terminal 200 has the second near-field communication region 210, where the second terminal 200 may be a notebook computer, a palmtop computer, a television, a display, or the like. The second near-field communication region 210 includes the first subunit 211 and the second subunit 212; the first subunit 211 and the second subunit 212 or merely the second subunit 212 are (is) used to detect whether a distance between the first near-field communication region 110 and the second near-field communication region 210 is less than or equal to a preset distance; and the second subunit 212 is used to establish communication with the first near-field communication region 110 when the distance between the first near-field communication region 110 and the second near-field communication region 210 is less than or equal to a preset distance, where the first near-field communication region 110 performs communication with the second subunit 212 of the second near-field communication region 210 by means of near-field communication.

Figure 7:
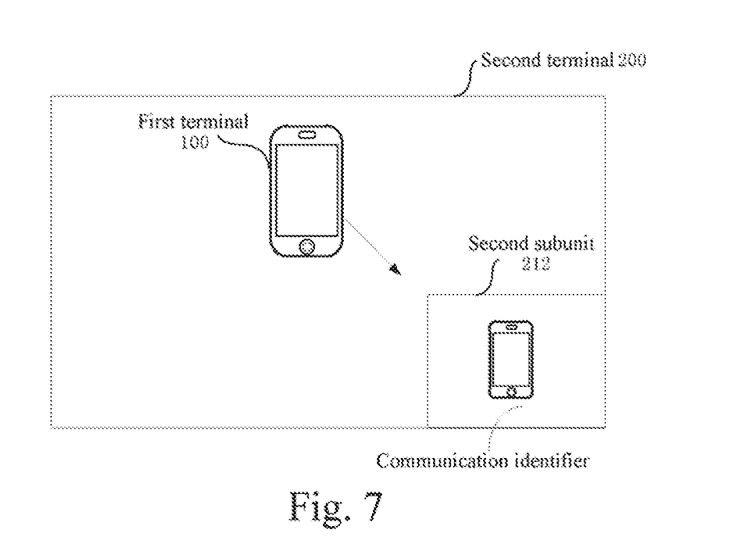
FIG. 7 is a schematic diagram of displaying a near-field communication identifier by a second terminal according to an embodiment of the present disclosure.

In this embodiment of the present disclosure, if an entire screen can be used to perform proximity detection, the second subunit 212 of the second near-field communication region 210 has a prompt identifier. When determining that the distance between the first near-field communication region 110 and the second near-field communication region 210 is less than or equal to the preset distance, the second terminal 200 sends a prompt of placing the first near-field communication region 110 to the second subunit 212. Specifically, as shown in FIG. 7, when the second terminal 200 is in proximity to the first terminal 100, a user may be prompted, by means of a user interface (UI), to place the first terminal 100 on the second subunit 212. For example, a near-field communication identifier may pop out on the second subunit 212 (for example, a middle location or a lower right corner) of the second terminal 200, and display to a user for prompting. In addition to popping out a near-field communication identifier to prompt a user, when the near-field communication identifier pops out, the second subunit 212 may also be controlled to flash to further prompt the user.

In the near-field communication system of this embodiment of the present disclosure, displaying the prompt identifier in the second subunit of the second near-field communication region enables a user to make the first terminal contact with/approach to the second terminal at any location. Meanwhile, the second subunit prompts the user to perform communication at a fixed location. In this way, a friendly interaction manner can be provided, thereby improving user experience.

To implement the foregoing embodiment, the present disclosure further provides a terminal.

Figure 8:
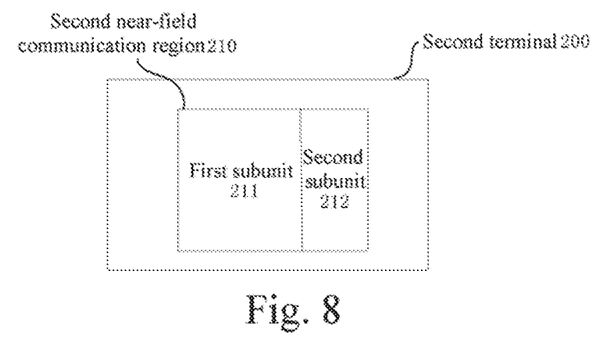
FIG. 8 is a schematic structural diagram of a terminal according to an embodiment of the present disclosure.

FIG. 8 is a schematic structural diagram of a terminal according to an embodiment of the present disclosure. As shown in FIG. 8, a terminal 200 includes a near-field communication region 210, where the near-field communication region 210 includes a first subunit 211 and a second subunit 212.

Specifically, the terminal 200 includes the near-field communication region 210, where the terminal 200 may be a notebook computer, a palmtop computer, a television, a display, or the like, and other terminal(s) may be a mobile phone, and the like. The near-field communication region 210 includes the first subunit 211 and the second subunit 212; the first subunit 211 and the second subunit 212 or merely the second subunit are (is) used to detect whether a distance between the near-field communication region 210 and a near-field communication region of other terminal(s) is less than or equal to a preset distance; the second subunit 212 is configured to establish communication with the near-field communication region of other terminal(s) when the first subunit 211 detects that the distance between the near-field communication region 210 and the near-field communication region of other terminal(s) is less than or equal to the preset distance. The second subunit 212 performs communication with the near-field communication region of other terminal(s) by means of near-field communication. The foregoing detecting whether a distance between the near-field communication region 210 and the near-field communication region of other terminal(s) is less than or equal to a preset distance maybe implemented by prior art, which, to avoid redundancy, is not further described in detail herein.

Specifically, the terminal 200 has the near-field communication region 210 of a larger area (for example, greater than 10 inches) with respect to other terminals. For example, the terminal 200 is a tablet computer, and other terminal(s) is a mobile phone; or the terminal 200 is a notebook computer, and other terminal(s) is a palmtop computer, or the like. For example, the near-field communication region 210 of the terminal 200 is a display screen of a notebook computer, and the near-field communication region of other terminal(s) is a display screen of a mobile phone; or the near-field communication region 210 of the terminal 200 is a touchpad, and the near-field communication region of other terminal(s) is a display screen of a mobile phone, or the like.

As shown in FIG. 3-1, the near-field communication region 210 of the terminal 200 may include the first subunit 211 and the second subunit 212. Specifically, the near-field communication region 210 may be divided into two regions of different sizes, namely, the first subunit 211 (a region outside a dashed line box) and the second subunit 212 (a region inside the dashed line box), by means of software segmentation. It should be understood that an area of the second subunit 212 is less than that of the first subunit 211. When it is detected that a near-field communication region of other terminal(s) is in proximity to the near-field communication region 210 of the terminal 200, communication with a communication body of the other terminal(s) is established by the second subunit 212. When the second subunit 212 performs communication with the near-field communication region of the other terminal(s), the first subunit 211 (some or all channels therein) in the near-field communication region 210 stop working.

Specifically, stopping working mainly refers to that channels keep a state of having smaller interference on other channels, for example, a disconnected (suspended) state or a direct-current fixed-level state, and in particular, refers to keeping the direct-current fixed-level state.

Further, a communication process between other terminal(s) and the terminal 200 may be divided into two parts, that is, proximity detection and data communication. The proximity detection is a preparation phase of the data communication. Generally, touch detection and the proximity detection are performed in a time-sharing manner, and a data communication phase begins only after the proximity detection succeeds. Touch detection and proximity detection may be referred to as first detection phase, and near-field communication may be referred to as second detection phase. The following mainly discusses the touch detection, and a processing manner of the proximity detection is similar to that of the touch detection.

An objective of the proximity detection is to enable the terminal 200 to sense whether other terminal(s) in communication with the terminal 200 exists. Because in this case, the terminal 200 does not need to perform data transmission with other terminal(s), a requirement on communication quality is lower.

Specifically, touch detection and near-field communication of different regions in the near-field communication region 210 of the terminal 200 can be implemented by means of channel switching. As shown in FIG. 3-1, Y0 to Y7 are longitudinal channels, and X0-X9 are transversal channels (typically, for example, Y0 to Y7 are driving channels, and X0 to X7 are sensing channels; it should be understood that one channel may also have both a driving function and a sensing function at the same time; and a detection channel mainly refers to an electrode channel having a sensing function). For the near-field communication region 210 in which Y0-Y7 are drive channels, and X0-X9 are sensing channels, when touch scanning of the first detection phase is performed on the near-field communication region 210, scanning should be performed on all the drive channels and sensing channels in the near-field communication region 210. That is, not only all drive channels and sensing channels in the first subunit 211, but also all drive channels and sensing channels in the second subunit 212 are scanned. In this case, the obtained data are used for touch processing on the near-field communication region 210. It should be understood that if the proximity detection needs to be performed on an entire screen, the proximity detection of the first detection phase may be completed according to a processing manner similar to that of the foregoing touch detection; if the proximity detection only needs to be performed on the second subunit, merely all drive channels and some sensing channels (for example, channels X7 to X9 in the region inside the dotted box in FIG. 3) of the specified second subunit 212 are scanned, so as to complete proximity detection processing.

When communication scanning of the second phase is performed on the near-field communication region 210, merely all drive channels and some sensing channels (the channels X7 to X9 in the region inside the dotted box in FIG. 3) of the specified second subunit 212 are scanned. In this case, the obtained data is used for communication processing on the near-field communication region 210. Therefore, if communication is performed with other terminal(s) only by means of a specified region (that is, the second subunit 212), an area, used for receiving effective signals, of the terminal 200 keeps unchanged, and an area, used for overall receiving, of the terminal 200 is reduced, thereby improving communication quality of signals.

It should be understood that if X7 to X9 in the terminal 200 have both a driving function and a sensing function at the same time, during data transmission, driving and receiving can also be performed by merely using the channels X7 to X9 in the second subunit 212. Therefore, power of the terminal can be saved.

The terminal of this embodiment of the present disclosure uses the specified region in the near-field communication region of the terminal as a dedicated communication region, and when detecting proximity of other terminal(s), the terminal performs data transmission with the other terminal(s) by means of the specified region. In this way, signal attenuation and external interference in data transmission can be reduced, thereby improving communication quality.

Figure 9:
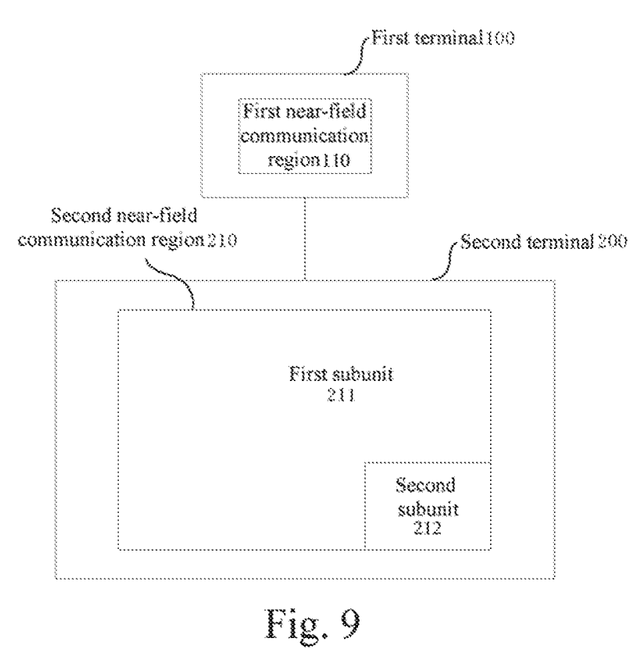
FIG. 9 is a schematic structural diagram of a terminal according to another embodiment of the present disclosure.

FIG. 9 is a schematic structural diagram of a terminal according to a specific embodiment of the present disclosure. As shown in FIG. 9, a terminal 200 includes a near-field communication region 210, where the near-field communication region 210 includes a first subunit 211 and a second subunit 212.

Specifically, the near-field communication region 210 may further include the first subunit 211 and the second subunit 212; the first subunit 211 and the second subunit 212 or merely the second subunit 212 are (is) used to detect whether a distance between the near-field communication region 210 of the terminal 200 and the near-field communication region of other terminal(s) is less than or equal to a preset distance. The second subunit 212 is used to establish communication with the near-field communication region of other terminal(s) when it is detected that the distance between the near-field communication region 210 and the near-field communication region of other terminal(s) is less than or equal to the preset distance.

As shown in FIG. 5-1, in this embodiment of the present disclosure, the near-field communication region 210 of the terminal 200 may be divided into two blocks, namely, the first subunit 211 in a non-communication region and the second subunit 212 in a communication region. The second subunit 212 has independent electrode channels (typically, for example, Y8 to Y10 are drive channels, and X10 to X12 are sensing channels; it should be understood that each channel may also have both a driving function and a sensing function at the same time; and a detection channel mainly refers to an electrode channel having a sensing function). That is, electrode channels in the first subunit 211 do not cover up the second subunit 212, and the near-field communication region 210 of the terminal 200 is equivalent to being constituted by two electrode regions combined with each other. In this way, an area of a region used for performing communication between the near-field communication region 210 of the terminal 200 and the near-field communication region of other terminal(s) can be further reduced, thereby improving communication quality.

Further, when the terminal 200 does not detect that the distance between the near-field communication region 210 and the near-field communication region of other terminal(s) is less than or equal to the preset distance, touch detection and proximity detection need to be performed on the near-field communication region of other terminal(s) in a time-sharing manner. Touch detection+proximity detection may be referred to as first detection phase, and near-field communication may be referred to as second-phase detection.

During the touch detection, drive channels and sensing channels in the first subunit 211 and the second subunit 212 are controlled synchronously to separately obtain data of the two electrode regions. Then splicing processing is performed on the data of the two electrode regions to obtain data of the near-field communication region 210 for performing touch processing on the near-field communication region 210. During the near-field communication, only the drive channels and the sensing channels in the second subunit 212 need to be controlled to obtain data of the second subunit 212 for performing communication processing on the near-field communication region 210. Specifically, during touch scanning of the first detection phase, all channels in the first subunit 211 and the second subunit 212 are scanned synchronously, and the data of the two electrode regions are combined to generate data of the entire near-field communication region 210. For example, two parts of data, as shown in Table 1 and Table 2, can be obtained during the first detection phase, wherein:

A0 to A10, B0 to B10, A'0 to A'2 . . . separately represent sampled data of each detection node, respectively. Typically, for example, A0 to A7 represent sampled data of nodes formed by X0 and Y0 to Y7, and A'0 to A'2 represent sampled data of nodes formed by X10 and Y8 to Y10, and so on.

| A0 | B0 | C0 | D0 | E0 | F0 | G0 | H0 | I0 | J0 |
|----|----|----|----|----|----|----|----|----|----|
| A1 | B1 | C1 | D1 | E1 | F1 | G1 | HI | I1 | J1 |
| A2 | B2 | C2 | D2 | E2 | F2 | G2 | H2 | I2 | J2 |
| A3 | B3 | C3 | D3 | E3 | F3 | G3 | H3 | I3 | J3 |
| A4 | B4 | C4 | D4 | E4 | F4 | G4 | H4 | I4 | J4 |
| A5 | B5 | C5 | D5 | E5 | F5 | G5 | 0  | 0  | 0  |
| A6 | B6 | C6 | D6 | E6 | F6 | G6 | 0  | 0  | 0  |
| A7 | B7 | C7 | D7 | E7 | F7 | G7 | 0  | 0  | 0  |

Table 1 shows sampled data of the first subunit 211

| A'0 | B'0 | C'0 |
|-----|-----|-----|
| A'1 | B'1 | C'1 |
| A'2 | B'2 | C'2 |

Table 2 shows sampled data of the second subunit 212

Then, the data shown in Table 1 and Table 2 are combined to calculate the data, as shown in Table 3, of the entire near-field communication region 210. In this way, a data collection process of the touch detection that is performed on the near-field communication region 210 can be completed.

It should be understood that if the proximity detection needs to be performed on an entire screen, the data collection process of the proximity detection of the first detection phase may be completed according to a processing manner similar to that of the foregoing touch detection; if the proximity detection only needs to be performed on the second subunit, merely the electrode channels of the specified second subunit 212 are scanned, so as to complete data collection processing of the proximity detection.

| A0 | B0 | C0 | D0 | E0 | F0 | G0 | H0 | I0 | J0 |
|----|----|----|----|----|----|----|----|----|----|
| A1 | B1 | C1 | D1 | E1 | F1 | G1 | H1 | I1 | J1 |
| A2 | B2 | C2 | D2 | E2 | F2 | G2 | H2 | I2 | J2 |
| A3 | B3 | C3 | D3 | E3 | F3 | G3 | H3 | I3 | J3 |
| A4 | B4 | C4 | D4 | E4 | F4 | G4 | H4 | I4 | J4 |
| A5 | B5 | C5 | D5 | E5 | F5 | G5 | A'0 | B'0 | C'0 |
| A6 | B6 | C6 | D6 | E6 | F6 | G6 | A'1 | B'1 | C'1 |
| A7 | B7 | C7 | D7 | E7 | F7 | G7 | A'2 | B'2 | C'2 |

Table 3 shows combined data of the entire screen of the near-field communication region 210

When communication scanning of the second detection phase is performed, merely electrode channels of a specified region are scanned, that is, as shown in FIG. 5-1, merely a region constituted by Y8 to Y10 and X10 to X12 is scanned. In this case, the obtained data is used for communication processing on the second near-field communication region 210. In this way, by means of hardware segmentation, the specified region in the near-field communication region 210 of the terminal 200 is used as a dedicated communication region and is enabled to have independent electrode channels. When detecting proximity of other terminal(s), the terminal 200 performs data transmission with the other terminal(s) by means of the specified region. In this way, signal attenuation and external interference in data transmission can be further reduced, thereby improving communication quality.

In this embodiment of the present disclosure, proximity detection can be performed on the entire screen, and the second subunit 212 of the near-field communication region 210 has a prompt identifier. When determining that the distance between the near-field communication region 210 and the near-field communication region of other terminal(s) is less than or equal to the preset distance, the terminal 200 sends a prompt of placing the near-field communication region of other terminal(s) to the second subunit 212. Specifically, as shown in FIG. 7, when other terminal(s) is in proximity to the terminal 200, the terminal 200 may prompt a user, by means of a UI, to place other terminal(s) on the second subunit 212. For example, a near-field communication identifier may pop out in or near the second subunit 212 (for example, a middle location or a lower right corner) of the terminal 200, and display to a user for prompting. In addition to popping out a near-field communication identifier to prompt a user, when the near-field communication identifier pops out, the second subunit 212 may also be controlled to flash to further prompt the user. Therefore, displaying the prompt identifier in the second subunit 212 of the near-field communication region 210 enables a user to make other terminal(s) contact with the terminal 200 at any location. Meanwhile, the second subunit 212 prompts the user to perform communication at a fixed location. In this way, a friendly interaction manner can be provided, thereby improving user experience.

The terminal of this embodiment of the present disclosure uses the specified region in the near-field communication region of the terminal as a dedicated communication region and makes it have independent electrode channels. When detecting proximity of other terminal(s), the terminal performs data transmission with the other terminal(s) by means of the specified region. In this way, signal attenuation and external interference in data transmission can be reduced, thereby improving communication quality.

In should be understood that each part of the present disclosure may be implemented by using hardware, software, firmware, or a combination thereof. In the foregoing implementation manners, multiple steps or methods may be implemented by using software or firmware that is stored in a memory and executed by an appropriate instruction execution system. For example, if the multiple steps or methods are implemented by using hardware, the same as that in another implementation manner, any one of the following technologies that are well known in the art or a combination thereof may be used to implement: a discrete logic circuit having a logic gate circuit used to implement a logic function on a data signal, a dedicated integrated circuit having an appropriate combinatorial logic gate circuit, a programmable gate array (PGA), a field programmable gate array (FPGA), and the like.

In the description of the present specification, description of reference terms such as "an embodiment", "some embodiments", "examples", "specific examples", or "some examples", etc., means that specific features, structures, materials or characteristics described with reference to the embodiment or example are included in at least one embodiment or example of the present disclosure. In the present specification, exemplary expression on the foregoing terms does not necessarily refer to the same embodiment or example. In addition, the described specific features, structures, materials or characteristics may be combined in an appropriate manner in any one or more embodiments or examples.

Although the embodiments of the present disclosure are shown and described, persons of ordinary skill in the art can understand: various changes, modifications, substitutions, and variations can be made to these embodiments without departing from the principle and objectives of the present disclosure; the scope of the present disclosure is defined by claims and equivalents thereof.

INDUSTRIAL APPLICABILITY

The near-field communication system of the embodiments of the present disclosure uses a specified region in a near-field communication region of a second terminal as a dedicated communication region. When detecting proximity of a first terminal, the second terminal performs data transmission with the first terminal by means of the specified region. In this way, signal attenuation and external interference in data transmission can be reduced, thereby improving communication quality.

The terminal of the embodiments of the present disclosure uses a specified region in a near-field communication region of the terminal as a dedicated communication region. When detecting proximity of other terminal(s), the terminal performs data transmission with the other terminal(s) by means of the specified region. In this way, signal attenuation and external interference in data transmission can be reduced, thereby improving communication quality.

The invention claimed is:

1. A near-field communication terminal, comprising:
   a near-field communication region comprising a first subunit and a second subunit,
   wherein the second subunit comprises one or more detect electrode channels that each one has both a driving function and a sensing function,
   wherein the second subunit detects, independently or cooperatively with the first subunit, a distance between another near-field communication region of another near-field communication terminal and the near-field communication region, and the second subunit independently establishes communication with the other near-field communication region of the other near-field communication terminal when the distance is within a preset distance,
   wherein a capacitive touch screen of the near-field communication terminal has a size different to that of the other near field communication terminal,
   wherein an area of the other near-field communication region is less than an area of the near-field communication region, and the near-field communication terminal is further configured to send a prompt of placing the other near-field communication region to the second subunit when determining that the distance is within the preset distance.

2. The near-field communication terminal according to claim 1, wherein the near-field communication terminal is a terminal with a capacitive touch screen comprising a plurality of detection channels, and the detection channels of the capacitive touch screen are divided into the first subunit and the second subunit by means of hardware.

3. The near-field communication terminal according to claim 1, wherein the near-field communication terminal is a terminal with a capacitive touch screen comprising a plurality of detection channels, and the detection channels of the capacitive touch screen are divided into the first subunit and the second subunit by means of software, wherein detection channels of a predetermined region of the near-field communication terminal are set as the second subunit and the remaining detection channels are set as the first subunit.

4. The near-field communication terminal according to claim 2, wherein an area of the detection channels of the second subunit is less than that of the detection channels of the first subunit.

5. The near-field communication terminal according to claim 2, wherein when the second subunit of the near-field communication region performs communication with the other near-field communication region, the first subunit of the near-field communication region is controlled to stop working.

6. The near-field communication terminal according to claim 2, wherein the second subunit of the near-field communication region comprises a prompt identifier to prompt a user to move the other near-field communication terminal to the second subunit.

7. The near-field communication terminal according to claim 1, wherein the near-field communication terminal is a terminal with a capacitive touch screen comprising a plurality of detection channels, and the detection channels of the capacitive touch screen are divided into the first subunit and the second subunit by means of software, wherein the second subunit is variable defined by detection channels on the near-field communication terminal overlapped with the other near-field communication region, and the remaining detection channels are set as the first subunit.

8. A near-field communication method, comprising:
   detecting a distance between a first near-field communication region of a first terminal and a second near-field communication region of a second terminal by the second terminal, wherein the second near-field communication region comprises a first subunit and a second subunit; and establishing, independently by the second subunit, communication between the first near-field communication region and the second near-field communication region when the distance is within a preset distance, wherein the second subunit comprises one or more detect electrode channels that each one has both a driving function and a sensing function, wherein the second subunit is configured to detect the distance, independently or cooperatively with the first subunit, wherein a capacitive touch screen of the near-field communication terminal has a size different to that of the other near-field communication terminal, wherein an area of the first near-field communication region is less than an area of the second near-field communication region, and the second terminal is further configured to send a prompt of placing the first near-field communication region to the second subunit when determining that the distance is within preset distance.

9. The near-field communication method according to claim 8, wherein the second terminal is a terminal with a capacitive touch screen comprising a plurality of detection channels, and the detection channels of the capacitive touch screen are divided into the first subunit and the second subunit by means of hardware.

10. The near-field communication method according to claim 8, wherein the second terminal is a terminal with a capacitive touch screen comprising a plurality of detection channels, and the detection channels of the capacitive touch screen are divided into the first subunit and the second subunit by means of software, wherein detection channels of a predetermined region of the second terminal are set as the second subunit and the remaining detection channels are set as the first subunit.

11. The near-field communication method according to claim 8, wherein the second terminal is a terminal with a capacitive touch screen comprising a plurality of detection channels, and the detection channels of the capacitive touch screen are divided into the first subunit and the second subunit by means of software, wherein the second subunit is variable defined by detection channels on the second terminal overlapped with the first near-field communication region, and the remaining detection channels are set as the first subunit.

12. The near-field communication method according to claim 9, wherein an area of the detection channels of the second subunit is less than that of the detection channels of the first subunit.

13. The near-field communication method according to claim 9, wherein when the second subunit of the second near-field communication region performs communication with the first near-field communication region, the first subunit of the second near-field communication region is controlled to stop working.

14. The near-field communication method according to claim 9, wherein the second subunit of the second near-field communication region comprises a prompt identifier to prompt a user to move the first terminal to the second subunit.

* * * * *